United States Patent [19]
Corrigan et al.

[11] Patent Number: 6,140,266
[45] Date of Patent: Oct. 31, 2000

[54] COMPACT AND LIGHT WEIGHT CATALYST BED FOR USE IN A FUEL CELL POWER PLANT AND METHOD FOR FORMING THE SAME

[75] Inventors: Thomas J. Corrigan, Vernon; Leonard J. Bonville, Jr., Marlbrough; Roger R. Lesieur; Derek W. Hildreth, both of Enfield; Maria G. Lukianoff, Vernon, all of Conn.

[73] Assignee: International Fuel Cells, Co., LLC, S. Windsor, Conn.

[21] Appl. No.: 09/252,154

[22] Filed: Feb. 18, 1999

[51] Int. Cl.[7] .............................. B01J 35/00; B01J 21/04; H01M 4/86; H01M 4/90
[52] U.S. Cl. .................... 502/439; 502/345; 502/343; 502/337; 502/339; 502/326; 502/527.11; 502/527.24; 502/527.18; 429/40; 429/41; 429/44
[58] Field of Search ................................ 502/439, 345, 502/343, 337, 339, 326, 527.11, 527.24, 527.18; 429/40, 41, 44

[56] References Cited

U.S. PATENT DOCUMENTS 5,174,968  12/1992  Whittenberger .
5,534,475  7/1996  Miramontes Cardenas et al. .

FOREIGN PATENT DOCUMENTS 0 913 357 A1  5/1999  European Pat. Off. .......... C01B 3/38

*Primary Examiner*—Tom Dunn
*Assistant Examiner*—Christina Ildebrando
*Attorney, Agent, or Firm*—William W. Jones

[57] ABSTRACT

A fuel gas catalyst bed for use in a fuel cell power plant is formed from a monolithic open cell foam component, the open cell lattice of which forms gas passages through the catalyst bed. The monolithic component has a lattice of internal open cells which are both laterally and longitudinally interconnected so as to produce a diffuse gas flow pattern through the catalyst bed. All areas of the monolithic component which form the gas flow pattern are provided with an underlying high porosity wash coat layer. The porous surface of the wash coat layer is provided with a nickel catalyst layer, or a noble metal catalyst layer, such as platinum, rhodium, palladium, or the like, over which the gas stream being treated flows. The base foam lattice can be a metal such as aluminum, stainless steel, a steel-aluminum alloy, a nickel alloy, a ceramic, or the like material which can be wash coated. The use of an open cell lattice as the basis of a catalyst bed enables the formation of very compact, light weight and high surface area catalyst bed with excellent gas flow-through characteristics.

16 Claims, 2 Drawing Sheets

COMPACT AND LIGHT WEIGHT CATALYST BED FOR USE IN A FUEL CELL POWER PLANT AND METHOD FOR FORMING THE SAME

TECHNICAL FIELD

This invention relates to a compact and light weight catalyst bed for use as a component in a fuel cell power plant. More particularly, this invention relates to a catalyst bed which has an open cell foam base onto which the catalyst is deposited. The foam base is first provided with a porous wash coat and the catalyst is deposited onto the wash coat thus providing a very high surface area catalyst layer.

BACKGROUND ART

Fuel cell power plants include fuel gas catalyst beds which are operable to catalytically convert a fuel gas, such as natural gas, propane, gasoline, diesel fuel, or the like, into hydrogen and carbon dioxide. The conversion process involves passing a raw fuel through a fuel processing system that can include four or more processing stations. The number and types of stations will vary according to the fuel used and the type of fuel cell in the power plant. At each station, the fuel process gas is fed through a catalytic reactor which serves a specific fuel processing function in the conversion of the raw fuel gas into a hydrogen-rich stream which is suitable for use in the fuel cell stack assembly of the power plant. Each catalytic reactor contains a catalyst bed for the reactions to take place. Typically these beds are made by catalyzing alumina or silica alumina pellets with an appropriate catalyst such as nickel, copper, zinc or noble metals such as platinum, palladium, rhodium, or the like. In a proton exchange membrane (PEM) type fuel cell designed to use gasoline for a vehicular application, the system would also include a sulfur scrubbing reactant bed, as well as a reformer, shift converter and selective oxidizer, as described in co-pending U.S. Pat. application Ser. No. 09/104,254, filed Jun. 24, 1998.

In a typical reformer for a stationary power plant, the conversion involves passing a mixture of the fuel gas and steam through a catalytic bed which is heated to a reforming temperature of about 1,250° F. to about 1,600° F. Catalysts typically used are nickel deposited on alumina pellets. A typical reformer will consist of a plurality of reaction tubes. Such a reactor is described in U.S. Pat. Nos. 4,098,587; 4,098,588; and 4,098,589. The resultant heated hydrogen rich gas mixture then flows from the reformer for further processing and utilization.

Steam reformers require a large catalyst bed surface area with a high degree of catalyst-fuel mixture interaction and a large heat transfer surface area to produce the amount of hydrogen required to generate any significant amount of fuel cell power. This need for a large catalyst bed and heat transfer surface area, when met by using catalyzed pellets in tubular reformers as described in the aforesaid patents, results in undesirably large and heavy reformer assemblies. For example, a commercially available stationary 200 KW acid fuel cell power plant includes a steam reformer component which has a volume of about 150 to 175 cubic feet; and weighs about 3,500 lbs.

U.S. Pat. No. 5,733,347, granted Mar. 31, 1998, discloses a steam reformer assembly which does not utilize catalyzed pellets, but rather uses a corrugated reformer core which has catalyzed walls. The corrugated reformer core forms parallel passages for the fuel being reformed, and also forms adjacent parallel burner gas passages which are disposed in direct heat exchange relationship with the reformer passages. Likewise, the reformer passages are in direct heat exchange relationship with the regenerator passages. This assembly is lighter in weight and more compact than a steam reformer which uses catalyzed pellets, and because of the high surface area of the corrugated core, provides very efficient heat transfer between the catalyzed reformer passages and the burner gas and regenerator passages. The assembly is formed from a sequence of essentially flat plates sandwiched around corrugated passages, and the assembly has a repeating pattern of burner passage, reformer passage, regenerator passage, reformer passage, burner passage, etc. Gas flow reversal manifolds connect the reformer passages with the regenerator passages. While the aforesaid flat plate assembly provides a significant reduction in weight and size, it does not provide a good gas mixing flow pattern for the gases passing through it because of the inclusion of the corrugated gas flow passages. Thus the corrugated design, because of its enhanced heat transfer properties, provides a more desirable size and weight reformer assembly, but the catalyzed pellet design provides a more desirable gas mixing flow pattern.

It would be highly desirable to provide a catalyst bed which is suitable for use in a fuel cell power plant, which catalyst bed provides the gas mixing flow pattern of the catalyzed pellets and is compact and light in weight like the catalyzed wall reformer described above.

DISCLOSURE OF THE INVENTION

This invention relates to a fuel cell system catalyst bed which provides an enhanced catalyst and heat transfer surface area; is compact and light weight; and provides an enhanced gas mixing and distribution flow path. The catalyst bed structure of this invention is formed from a monolithic open cell foam core which is provided with a high surface area porous wash coat layer onto which the catalyst layer is deposited. The wash coat may be alumina, silica-alumina, silica, ceria, silicon carbide, or another high surface ceramic material. The choice of wash coat will depend on the operating parameters of the specific catalyst bed. The monolithic gas flow component is a foam with interconnected open cells, the surfaces of which are catalyzed with a nickel, copper or zinc catalyst, or with such noble metal catalysts such as platinum, palladium, rhodium, or the like. The open cell foam, once wash coated, provides the high surface area base required in order to achieve the deposition of the high surface area catalyst needed to properly process the fuel gas. The open cell foam also provides an enhanced mixing and distribution gas flow pattern for gases passing through the monolith since the gases will flow both laterally and longitudinally through the structure. The open cell foam also provides high surface area heat transfer paths that contribute to a more turbulent gas flow that enhances heat transfer rates in systems utilizing the catalyst bed. Additionally, the high heat transfer provided by the foam can be continued into and through adjacent walls of the reactor so as to create a highly efficient heat transfer device that results in improved process temperature control and usually reduce size and weight of the components for a given output level. The intervening walls may be flat plates or they may be conduits with coolant flow capabilities to which the monolithic open cell foam may be bonded by brazing or any other appropriate mechanism suitable for the system in question.

All surfaces to be catalyzed will be primed by means of a conventional wash coating process such as that provided by W. R. Grace and Co. or Englehard Corp. The wash coating process produces a porous alumina layer on all surfaces of the foam, which alumina layer forms a base for the catalyst coating. The use of the open cell foam monolith construction, with its maximized surface area, allows minimization of the catalyst bed size and weight. The core of the open cell monolith foam may be formed from aluminum, stainless steel, an aluminum-steel alloy, silicon carbide, nickel alloys, carbon, graphite, a ceramic, or the like material which can be wash coated. It will be understood that the interstices as well as the outside surfaces of the open cell foam monolith are wash coated and, where desirable, are also catalyzed. Since the catalyst beds are of minimal size and weight, they are especially suited to vehicular applications where size and weight are critically important, and because vehicle applications require rapid start-up capability that is closely dependent on the size and weight of the components. Small, light weight catalyst and reactant beds can be rapidly heated with a minimum energy input.

It is therefore an object of this invention to provide an improved fuel gas processing catalyst bed which catalyst bed is compact and light weight.

It is a further object of this invention to provide a catalyst bed of the character described which operates at lower temperatures than presently available catalyst beds due to improved heat transfer capabilities.

It is another object of this invention to provide a catalyst bed of the character described which provides enhanced gas mixing and distribution flow paths for fuel gases flowing through the catalyst bed.

It is yet another object of this invention to provide a catalyst bed of the character described which provides enhanced heat transfer within the reactor.

It is an additional object of this invention to provide a catalyst bed of the character described which includes an open cell foam core which is wash coated with a high surface area ceramic, such as alumina, silica-alumina, silica, ceria, silicon carbide, or the like, which is provided with an appropriate catalyst layer.

BRIEF DESCRIPTION OF THE DRAWINGS

These and other objects and advantages of this invention will become readily apparent to one skilled in the art from the following detailed description of a preferred embodiment of the invention when taken in conjunction with the accompanying drawings in which.

SPECIFIC MODE FOR CARRYING OUT THE INVENTION

Figure 1:
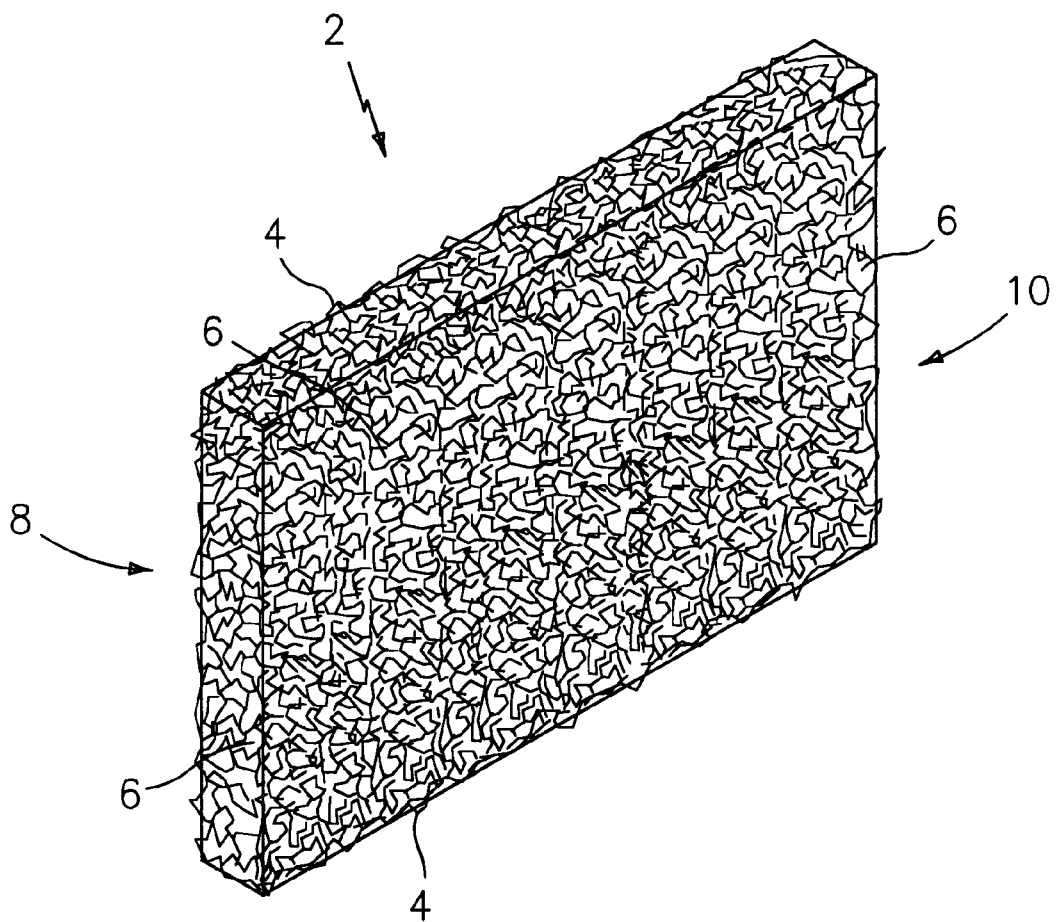
FIG. 1 is a perspective view of one form of an open cell foam catalyst bed.

Referring now to the drawings, there is shown in FIG. 1 a perspective view of a rectilinear form of a catalyst bed formed in accordance with this invention, which bed is denoted generally by the numeral 2. The catalyst bed 2 is a monolithic open cell foam component which includes a lattice network of tendrils 4 which form a network of open cells 6 which are interconnected in the X, Y and Z directions within the bed 2. The interconnected open cells 6 are operable to form an enhanced fuel gas mixing and distribution flow path from end 8 to end 10 of the bed 2. The open cells 6 and the tendrils 4 also provide a very large catalyzable surface area in the bed 2. The core of the foam catalyst bed 2 can be formed from aluminum, stainless steel, an aluminum-steel alloy, silicon carbide, nickel alloys, carbon, graphite, a ceramic, or the like material.

The bed 2 is catalyzed in the following manner. A wash coated porous alumina primer is applied to all outer and interstitial surfaces in the bed 2 which are to be catalyzed. The alumina wash coat can be applied to the bed 2 by dipping the bed 2 into a wash coat solution, or by spraying the wash coat solution onto the bed 2. The wash coated bed 2 is then heat treated so as to form the alumina layer on the core. The catalyst layer is then applied to the alumina surfaces of the bed 2. If so desired, the alumina coating and catalyzing steps can be performed concurrently. Similar steps could be used for other wash coating materials.

Figure 2:
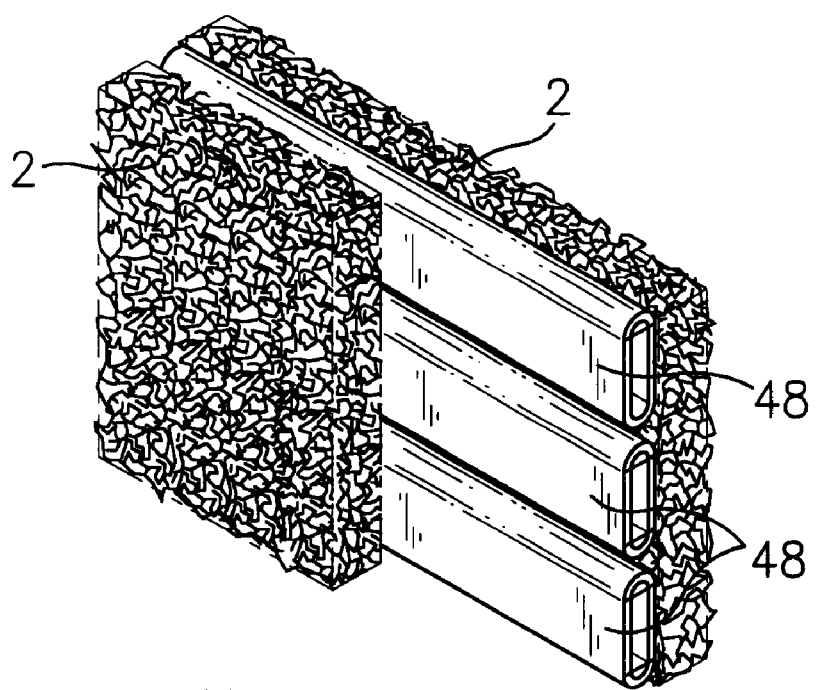
FIG. 2 is a fragmented perspective view of a heat transfer component and foam catalyst bed assembly which are bonded together.

FIG. 2 is a fragmented perspective view showing separate members of the foam components 2 which are bonded to heat transfer components 48. By bonding the open cell foam components 2 to an adjacent heat transfer components 48 which can be a planar wall or a coolant conduit, continuation of the high thermal conductivity of the foam 2 into the heat transfer component 48 is achieved. The heat transfer components 48 can made of aluminum, stainless steel, steel-based alloys containing aluminum, or high nickel alloys, as dictated by requirements of the system into which the components 2, 48 are incorporated.

The open cell foam catalyst bed structure provides improved heat transfer, improved gas flow characteristics, and maximized catalyst surface area. The weight and size reductions achieved by using the catalyst bed construction of this invention are necessary for use in smaller applications such as in mobile vehicles, due to their smaller size and weight. Small size and weight also allow for rapid catalyst bed heatup to operating temperatures which is a critical requirement for quick start capability necessary in most vehicle applications. The reduced size and weight will also benefit the packaging of stationary power plants. Monolith cores of the type described above can be obtained from ERG Energy Research and Generation, Inc. of Oakland, Calif. which cores are sold under the registered trademark "DUO-CEL".

Since many changes and variations of the disclosed embodiment of the invention may be made without departing from the inventive concept, it is not intended to limit the invention other than as required by the appended claims.

What is claimed is:

1. A catalyst bed for use in a fuel processing system that catalytically renders a fuel gas stream useful for fueling a fuel cell power plant, said catalyst bed comprising a monolithic open cell foam member having a lattice of internal open cells which are both laterally and longitudinally interconnected and that defines interconnected interstices which produce a laterally and longitudinally diffuse gas flow pattern through the catalyst bed, said lattice having a core which is provided with a porous wash coat layer on all surfaces of said core; and a catalyst deposited on said wash coat layer.

2. The catalyst bed of claim 1 wherein the wash coat layer is a porous ceramic material selected from the group consisting of alumina, silica, silica-alumina, ceria, silicon carbide, or another porous ceramic material.

3. The catalyst bed of claim 1, wherein said monolithic member is formed from a material selected from the group consisting of aluminum, an aluminum-steel alloy, a nickel alloy, silicon carbide, carbon, graphite, stainless steel, or a ceramic.

4. The catalyst bed of claim 1, wherein said catalyst is a metal selected from the group consisting of copper, zinc, nickel, platinum, rhodium and palladium.

5. The catalyst bed of claim 1 wherein said catalyst is nickel, copper or zinc.

6. The catalyst bed of claim 1 wherein said catalyst is a noble metal.

7. The catalyst bed of claim 1 wherein said bed is bonded to an adjacent heat transfer member in order to establish a heat transfer relationship between said bed and said member.

8. A method for forming a catalyst bed for use in a fuel processing system that catalytically renders a fuel gas stream useful for fueling a fuel cell power plant, said method comprising the steps of:
   a) providing a monolithic open cell foam member having a lattice of internal open cells which are both laterally and longitudinally interconnected and that defines interconnected interstices which produce a laterally and longitudinally diffuse gas flow pattern through the catalyst bed, said lattice having a core;
   b) forming a porous wash coat layer on all surfaces of said core; and
   c) depositing a catalyst on said wash coat layer.

9. The method of claim 8 wherein the wash coat layer is a porous ceramic material selected from the group consisting of alumina, silica, silica-aluminum, ceria, silicon carbide, or another porous ceramic material.

10. The method of claim 8, wherein said monolithic member is formed from a material selected from the group consisting of aluminum, an aluminum-steel alloy, stainless steel, a nickel alloy, carbon, graphite, silicon carbide or a ceramic.

11. The method of claim 8, wherein said catalyst is a metal selected from the group consisting of nickel, platinum, rhodium and palladium.

12. The method of claim 8 wherein said catalyst is nickel, copper or zinc.

13. The method of claim 8 wherein said catalyst is a noble metal.

14. The method of claim 8 including the further step of bonding the monolithic open cell foam member to an adjacent heat transfer member so as to establish a thermal conductivity relationship between said open cell foam member and said heat transfer member.

15. The method of claim 14 wherein said heat transfer member includes a plate.

16. The method of claim 14 wherein said heat transfer member includes a coolant conduit.

\* \* \* \* \*